(12) United States Patent
Saeki et al.

(10) Patent No.: US 10,974,347 B2
(45) Date of Patent: Apr. 13, 2021

(54) INFORMATION PROJECTING METHOD AND APPARATUS AND LASER PROCESSING APPARATUS

(71) Applicant: AMADA HOLDINGS CO., LTD., Kanagawa (JP)

(72) Inventors: Shuichi Saeki, Kanagawa (JP); Hidenori Komiya, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/635,785

(22) PCT Filed: Jul. 24, 2018

(86) PCT No.: PCT/JP2018/027603
§ 371 (c)(1),
(2) Date: Jan. 31, 2020

(87) PCT Pub. No.: WO2019/031222
PCT Pub. Date: Feb. 14, 2019

(65) Prior Publication Data
US 2020/0376604 A1    Dec. 3, 2020

(30) Foreign Application Priority Data
Aug. 7, 2017    (JP) .............................. JP2017-152150

(51) Int. Cl.
   *B23K 26/38*    (2014.01)
   *B23K 26/03*    (2006.01)
   (Continued)

(52) U.S. Cl.
   CPC ............ *B23K 26/38* (2013.01); *B23K 26/032* (2013.01); *B23K 26/70* (2015.10);
   (Continued)

(58) Field of Classification Search
   CPC .... B23Q 17/20; B23Q 17/24; B23Q 17/2471; B23K 26/38; B23K 26/70; B23K 26/032;
   (Continued)

(56) References Cited

U.S. PATENT DOCUMENTS 4,760,237 A * 7/1988 Mizukado ............... B23K 26/10
                                                       198/468.6
5,304,773 A * 4/1994 Kilian .................... B23K 26/04
                                                       219/121.78
(Continued)

FOREIGN PATENT DOCUMENTS

DE          4140428 A1 * 6/1993 ........... B21D 43/003
JP          09159410 A * 6/1997
(Continued)

OTHER PUBLICATIONS

International Search Report issued in International Patent Application No. PCT/JP2018/027603, dated Oct. 16, 2018.
(Continued)

*Primary Examiner* — Geofrey S Evans
(74) *Attorney, Agent, or Firm* — Greenblum & Bernstein, P.L.C.

(57) ABSTRACT

An information projecting method projects information concerning a cut piece onto the cut piece, which is cut and separated from a plate-like work and is on a placement table, or onto a position adjacent to the cut piece. To adjust to an aspect ratio of a projector, the method assigns a long side of the work to an X-axis direction of the aspect ratio and a short side of the work to a Y-axis direction of the aspect ratio, finds a positional relationship d between a top face of the work and the projector according to plate thickness information of the work on the placement table and positioned corresponding to the projector arranged at a predetermined Y-axis-direction position, and with a zoom ratio based on the found positional relationship, projects the information concerning (Continued)

the cut piece onto the cut piece or onto a position adjacent to the cut piece.

9 Claims, 4 Drawing Sheets

(51) Int. Cl.
*H04N 9/31* (2006.01)
*B23K 26/70* (2014.01)
*B23K 37/04* (2006.01)
*B23K 101/18* (2006.01)

(52) U.S. Cl.
CPC ....... *B23K 37/0408* (2013.01); *H04N 9/3188* (2013.01); *B23K 2101/18* (2018.08)

(58) Field of Classification Search
CPC ............ B23K 37/0408; B23K 2101/18; H04N 9/3188
See application file for complete search history.

(56) References Cited

U.S. PATENT DOCUMENTS

| | | | |
|---|---|---|---|
| 5,726,366 A | * | 3/1998 | Washio ................. B23Q 17/20 356/635 |
| 2017/0109932 A1 | | 4/2017 | Fujimoto et al. |

FOREIGN PATENT DOCUMENTS

| | | | |
|---|---|---|---|
| JP | 2002-169604 A | | 6/2002 |
| JP | 2002-196736 A | | 7/2002 |
| JP | 2004-046730 A | | 2/2004 |
| JP | 2007-208905 A | | 8/2007 |
| JP | 2013-202667 A | | 10/2013 |
| JP | 5866240 B2 | | 2/2016 |
| JP | 2017-076943 A | | 4/2017 |

OTHER PUBLICATIONS

Written Opinion of the International Searching Authority issued in International Application No. PCT/JP2018/027603, dated Oct. 16, 2018.
Decision to Grant a Patent in Japan Counterpart Patent Appl. No. 2017-152150, dated Apr. 9, 2019.
Notification of Reasons for Refusal (Office Action) in Japan Patent Appl.. 2017-152150, dated Oct. 9, 2018.

* cited by examiner

INFORMATION PROJECTING METHOD AND APPARATUS AND LASER PROCESSING APPARATUS

TECHNICAL FIELD

The present invention relates to an information projecting method and apparatus and a laser processing apparatus provided with the information projecting apparatus, for projecting information concerning a cut piece (product), which is cut and separated from a plate-like work and is placed on a placement table such as a pallet, onto a top face of the cut piece or onto a position adjacent to the cut piece. More precisely, the present invention relates to an information projecting method and apparatus and a laser processing apparatus provided with the information projecting apparatus, capable of correctly projecting information concerning a cut piece onto a top face of the cut piece even if a plate thickness of the cut piece or the number of stacked cut pieces is changed to change a top face height position of the cut piece on a placement table.

BACKGROUND ART

Conventionally, cut pieces (products) cut and separated from a plate-like work by, for example, laser processing device or punch press are sometimes sorted piece by piece and stacked on a product pallet. It is practiced to store the product pallet on a shelf in a shelf device. It is also practiced to store a process pallet, on which a plate-like work in a state cut by laser processing device is placed as it is, on a shelf in a shelf device.

And when carrying the cut piece on the product pallet or a cut piece on the process pallet to the next process, it is practiced to project information concerning the cut piece onto the cut piece (for example, refer to Patent Literature 1).

PRIOR ART DOCUMENT

Patent Literature

Patent Literature 1: Japanese Patent Publication No. 5866240

SUMMARY OF THE INVENTION

A configuration mentioned in the Patent Literature 1 places a pallet on a vertically movable elevator arranged in front of a shelf device. When the elevator is positioned at a predetermined height position, information concerning a processed product, which is on the pallet placed on the elevator, is projected onto the processed product from a projecting device arranged at an upper part of the shelf device.

Accordingly, if the top face height position of the processed product changes due to a difference in the plate thickness of the processed product placed on the pallet or due to the number of processed products stacked on the pallet, a positional relationship between the projecting device and the top face of the processed product changes to change a projecting position. As a result, whenever, for example, the plate thickness of the processed product on the pallet differs, it is necessary to adjust the position and zoom ratio (enlargement factor) of a projector serving as the projecting device.

In consideration of the above-mentioned problem, the present invention provides an information projecting method of projecting information concerning a cut piece, which is cut and separated from a plate-like work and is on a placement table, onto the cut piece or onto a position adjacent to the cut piece from a projector, comprising: assigning alongside of the work to an X-axis direction being horizontal direction of an aspect ratio for adjusting to the aspect ratio (vertical to horizontal ratio) of the projector; assigning a short side of the work to a Y-axis direction being vertical direction of the aspect ratio; finding a positional relationship between a top face of the work and the projector according to plate thickness information and/or stacked number information of the work on the placement table positioned according to the projector arranged at a predetermined position; and projecting the information concerning the cut piece onto the cut piece or onto a position adjacent to the cut piece with a zoom ratio based on the found positional relationship.

In the above-mentioned information projecting method, when an X-axis-direction zoom ratio of the work is equalized with a Y-axis direction zoom ratio of the work and B1 is set as a Y-axis spread angle of the projector at the time of conducting projection onto an upper end edge of a processing object work having a maximum plate thickness at a Y-axis-direction origin position distal from the projector, there is adjusted a projection position, which is on the placement table at the time of conducting projection with the spread angle B1 onto a plate thickness of zero and is distal from the projector, to a reference position of the work.

In the above-mentioned information projecting method, projection is conducted with a different color onto a cut piece to be carried, blinking projection is conducted onto the cut piece to be carried, or alight spot is projected onto a top face of the cut pieces to be carried, thereby displaying and specifying the cut piece to be carried.

The present invention also provides an information projecting apparatus for projecting information concerning a cut piece, which is cut and separated from a plate-like work, onto the cut piece or onto a position adjacent to the cut piece comprising: a placement table on which the cut piece is placed by keeping a top face height position substantially constant; a projector that projects the information concerning the cut piece onto a top face of the cut piece on the placement table, or onto a position adjacent to the cut piece; a positional relationship operation part that operates a positional relationship between the top face of the cut piece and the projector according to plate thickness information of the cut piece on the placement table and/or stacked number information; and a magnification operation part that operates a zoom ratio of the projector according to an operation result of the positional relationship operation part, wherein the zoom ratio of the projector is adjusted according to an operation result of the magnification operation part and the information concerning the cut piece is projected onto the cut piece or onto a position adjacent to the cut piece.

In the information projecting apparatus, the positional relationship operation part is configured to operate the positional relationship according to a coordinate position of the projector arranged at a predetermined Y-axis-direction position and a plate thickness of the cut piece, a plate thickness of a work, or a stacked number on the placement table.

The present invention also provides a laser processing apparatus having a shuttle table reciprocable between a laser processing position and a standby position comprising the above mentioned information projecting apparatus at a Y-axis-direction side position at the standby position.

DESCRIPTION OF EMBODIMENTS

Hereunder, embodiments of the present invention will be explained with reference to the drawings. A case of applying an information projecting apparatus according to an embodiment of the present invention to a laser processing apparatus will be explained.

As is understood from the following explanation of the embodiment, the information projecting apparatus is beneficial if applied to a process of sorting cut pieces (products) cut and separated from a plate-like work by the laser processing apparatus.

Also, the information projecting apparatus is applicable when manually sorting and carrying cut pieces (products), which are cut and separated by, for example, punch press or laser processing machine, to the next process. By the way, the information projecting apparatus is also applicable when sorting and carrying cut pieces (products), which are orderly aligned and placed (stacked) on a product pallet that is an example of a placement table set at a sorting and carrying position, to the next process.

Figure 1:
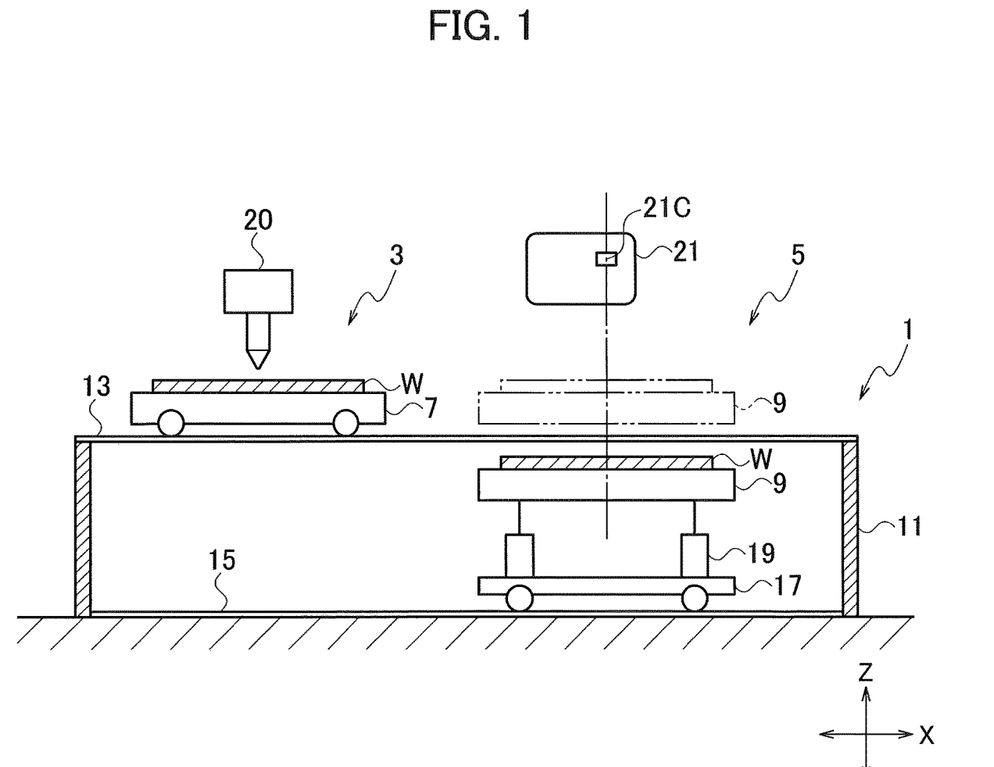
FIG. 1 is a configuration explanatory view schematically roughly showing a configuration of a laser processing apparatus according to an embodiment of the present invention.

Now, as schematically shown in FIG. 1, the laser processing apparatus 1 (a general configuration thereof not illustrated) has shuttle tables 7 and 9 that are an example of a placement table and are reciprocable between a laser processing area (laser processing position) 3 and a standby area (standby position) 5. It is possible to employ one shuttle table (placement table), but a case of employing two tables will be explained.

As mentioned above, the laser processing apparatus having the shuttle tables reciprocable between the laser processing position 3 and the standby position 5 may have various configurations as mentioned in, for example, Japanese Patent Publication No. H5-65273, Japanese Unexamined Patent Application Publication No. 2000-33444, Japanese Patent Publication No. 3710871, Japanese Patent Publication No. 4326252, and the like. Accordingly, a detailed explanation for a general configuration of the laser processing apparatus 1 is omitted and an outline thereof will be explained.

The laser processing apparatus 1 has a stand 11 of, for example, a box shape. On each side of a Y-axis direction (a direction orthogonal to a plane surface of FIG. 1) on the stand 11, a guide rail 13 is arranged to extend in an X-axis direction (left-right direction in FIG. 1). The guide rails 13 support the first shuttle table (placement table) 7 to reciprocate in the X-axis direction.

On a floor part in the stand 11, guide rails 15 are arranged in the X-axis direction. The guide rails 15 support a movable cart 17. The movable cart 17 is provided with the vertically movable second shuttle table 9 (placement table) that is vertically moved by an up-down operation device 19 such as a fluid pressure cylinder.

The second shuttle table 9 is movable in the X-axis direction to pass under the first shuttle table 7. And if lifted by the operation of the up-down operation device 19 at the laser processing position 3 or at the standby position 5, the second shuttle table 9 takes the same height as the first shuttle table 7. Namely, at the laser processing position 3 and standby position 5, the second shuttle table 9 is raised to take the same height as the first shuttle table 7.

The first and second shuttle tables 7 and 9 are configured to synchronously move in opposite directions. A configuration to synchronously move the first and second shuttle tables 7 and 9 in opposite directions may be similar to a conventional configuration. It is possible to separately drive the first and second shuttle tables 7 and 9 so that they are synchronously driven in opposite directions.

The laser processing apparatus 1 is provided with a laser processing head 20 to perform laser processing on a plate-like work W on the first and second shuttle table 7 and 9 positioned at the laser processing position 3. The laser processing head 20 is arranged to be movable in the X-, Y-, and Z-axis directions with respect to the work W positioned at the laser processing position 3.

With the above-mentioned configuration, it is possible to alternately move and position the first and second shuttle tables 7 and 9 to and at the laser processing position 3 and standby position 5. Accordingly, when, for example, the first shuttle table 7 is positioned at the laser processing position 3 for laser processing, the second shuttle table 9 is positioned at the standby position 5. And a cut piece (product) on the second shuttle table 9 is carried to the next process and a work W to be processed next is placed on the second shuttle table 9. Namely, works W on the first and second shuttle tables 7 and 9 are alternately laser-processed and the laser-processed cut pieces are alternately carried out of the first and second shuttle tables 7 and 9.

By the way, when a cut piece (product) is carried out of the first and second shuttle table 7 and 9 positioned at the standby position 5, it is beneficial to project information concerning the cut piece onto a top face of the cut piece or onto a position adjacent to the cut piece so that a worker is able to sort the cut piece according to the projected information. This improves the efficiency of the sorting work.

For this, a projector 21 is arranged as an example of a projecting device to project information concerning each cut piece placed on the first and second shuttle table 7 and 9 positioned at the standby position 5 onto the cut piece or onto a position adjacent to the cut piece. More precisely, on a side of the Y-axis direction of the stand 11, a movable cart (not shown) movable in the Y-axis direction is arranged to be positionally adjustable and fixable. And on a support post (not shown) uprightly arranged on the cart, the projector 21 is arranged so that it is positionally adjustable and fixable in an up-down direction. Namely, the projector 21 is arranged so that it can be positioned at a required position with respect to the stand 11 and can be fixed to the positioned position.

By the way, the projector 21 is able to be arranged not only on a side of the Y-axis direction but also on aside of the X-axis direction. It is also possible to arrange the same at a position above the first and second shuttle table 7 and 9 positioned at the standby position 5.

An X-axis-direction position of a lens of the projector 21 (hereafter referred to as an X-axis-direction center position 21C of the projector 21) is set at a position agreeing with an X-axis-direction center position of a maximum work W when the first and second shuttle table 7 and 9 on which the work W is placed is positioned at an origin position (reference position) of the standby position 5. In other words, when the first and second shuttle table 7 and 9 is positioned at the origin position (reference position) of the standby position 5, the X-axis-direction center position of the first and second shuttle table 7 and 9 agrees with the X-axis-direction center position 21C of the projector 21.

Accordingly, the first and second shuttle tables 7 and 9 are alternately separately positioned at the origin position of the standby position 5. When the second shuttle table 9 is lifted to the same height as the first shuttle table 7, the top face of the first and second shuttle table 7 and 9 alternately positioned to the standby position 5 and the projector 21 have a constant positional relationship in the X-axis direction. The projector 21 at the time of use is positionally adjusted in the Y- and X-axis directions and is kept in the position-adjusted state. Accordingly, when the first and second shuttle tables 7 and 9 are alternately separately positioned at the origin position of the standby position 5, a positional relationship in the Y-axis direction between the projector 21 and the first and second shuttle table 7 and 9 and a positional relationship in the Z-axis direction between the projector 21 and the top face of the first and second shuttle table 7 and 9 are always fixed.

By the way, aspect ratios (vertical to horizontal ratios) of the projector are optimized to, in many cases, three kinds including, for example, 16:9, 16:10, and 4:3. And standard sizes of plate-like works are, for example, 4×8 (called: four by eight, size: 1219 mm×2438 mm), 5×10 (called: five by ten, size: 1524 mm×3048 mm), and the like. Accordingly, supposing that a longer direction of a work is the X-axis direction and a shorter direction thereof is the Y-axis direction, a size ratio in the X and Y directions is X:Y, i.e., X:Y=2:1. Here, the X- and Y-direction maximum sizes are Xmax and Ymax.

As mentioned above, there are a various kinds of aspect ratios for a projector. An aspect ratio frequently adopted for personal computer displays is 16:10. Further, there are many projectors adopting the aspect ratio of 16:10. Accordingly, this embodiment is explained by adopting the aspect ratio of 16:10. In this case, X:Y=16:10.

Figure 2:
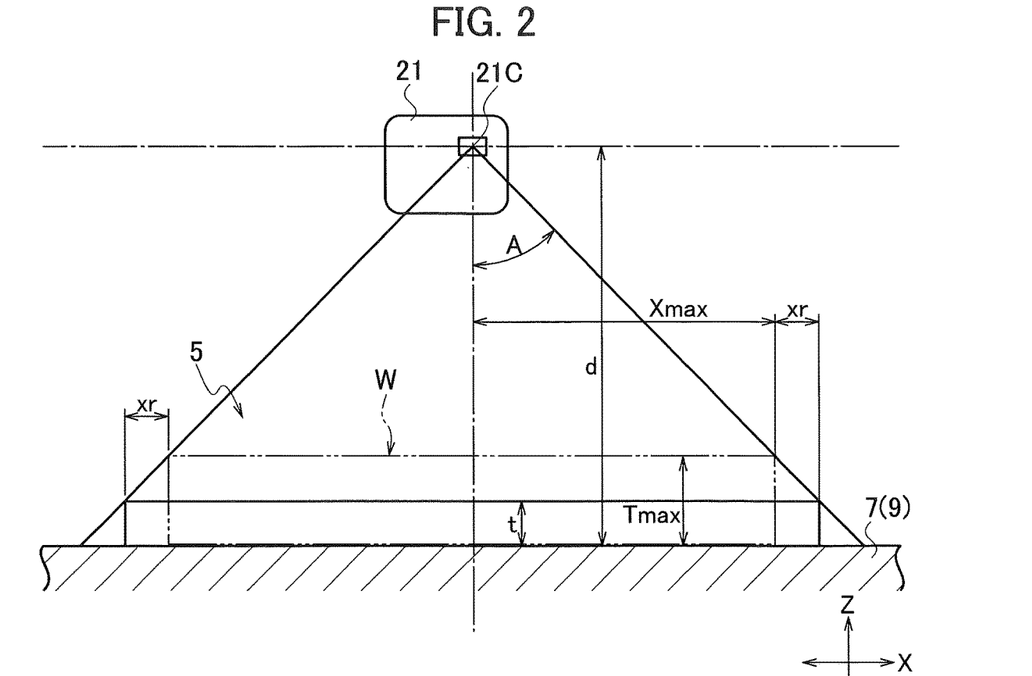
FIG. 2 is an explanatory view showing elements to operate positional relationships between a work and a projector in X-axis and up-down (Z-axis) directions.

Here, as shown in FIG. 2, an X-axis-direction spread angle of the projector 21 is set as 2A. In this case, an X-axis-direction center position of the shuttle table 7 (9) alternately positioned to the standby position 5 agrees with an X-axis-direction center position of the projector 21. Accordingly, with respect to a processing object work having a maximum plate thickness Tmax placed on the shuttle table 7 (9) positioned at the standby position 5, the spread angle 2A is adjusted such that both ends of the work W in the X-axis direction are contained in a projection range of the spread angle 2A.

With no work W placed on the shuttle table 7 (9), a height measurement from the top face of the shuttle table 7 (9) to the center position 21C of the projector 21 is set as d. And a measurement from an X-direction center position of the work W having the plate thickness Tmax to an X-axis-direction end part thereof is set as Xmax'. If the projection spreads up to Xmax' with respect to the plate thickness Tmax, an X-axis-direction projection range for a plate thickness t=0 is {Xmax'+Tmax×tan A}×2.

Accordingly, a height position of the projector 21 is adjusted and set in advance so that an X-axis-direction projection range at the spread angle 2A becomes {Xmax'+Tmax×tan A}×2 and a height dimension from the top face position of the shuttle table 7 (9) becomes d.

Here, supposing the plate thickness of a work processed by the laser processing apparatus is t, an end part of the work of plate thickness t relative to the work W of plate thickness Tmax protrudes by a measurement Xr on each side of the X-axis direction as shown in FIG. 2. And the measurement Xr is expressed as Xr=(Tmax−t)×tan A. In other words, the measurement Xr is a measurement of an area to be reduced when adjusting a projection range to the plate thickness Tmax. Accordingly, a reduction ratio R when projecting graphic data supplied from, for example, a personal computer onto the plate thickness Tmax is expressed as R=Xmax'/(Xmax'+Xr)=Xmax'/{Xmax'+(Tmax−t)×tan A}.

Figure 3:
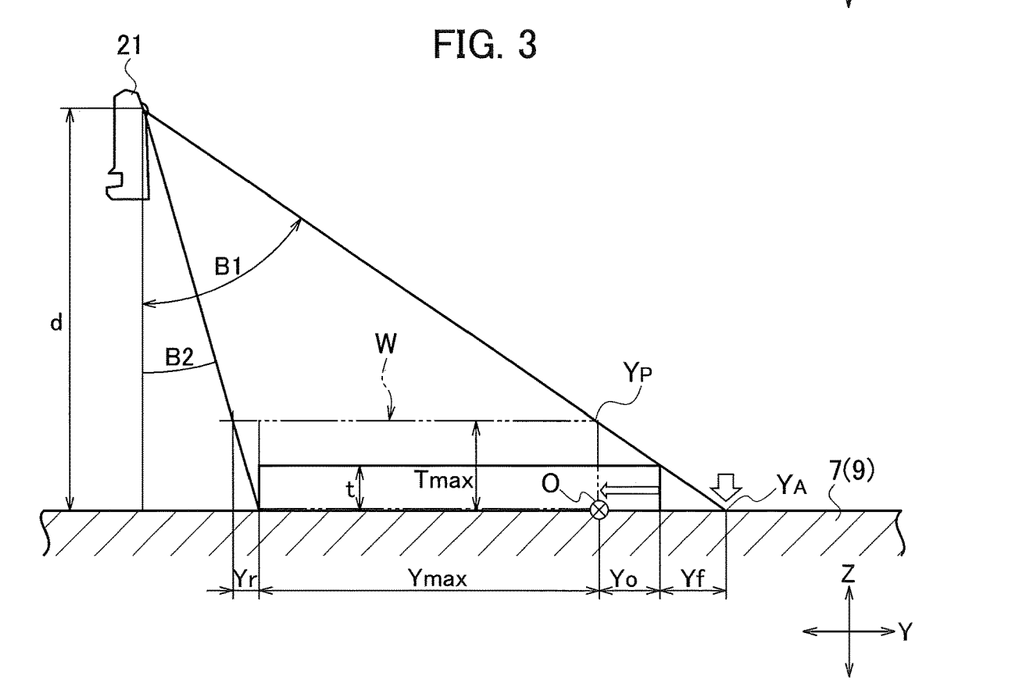
FIG. 3 is an explanatory view showing a positional relationship between the work and the projector in a Y-axis direction.

Next, a Y-axis-direction projection range will be explained. Y-axis-direction projection is conducted with the reduction ratio R. As shown in FIG. 3, the height position of the projector 21 from the top face of the shuttle table 7 (9) is the measurement d. Here, the maximum plate thickness of the work W placed on the shuttle table 7 (9) is Tmax and one end edge of the work W in the Y-axis direction is beforehand made coincide with a Y-axis-direction origin position (reference position).

And, as shown in FIG. 3, supposing a Y-axis-direction maximum measurement of the work W is Ymax, a Y-axis-direction spread angle of the projector 21 is B1 with respect to an upper end edge Yp above the origin position O of the work W having the plate thickness Tmax (namely, the edge Yp is an upper end edge of the maximum plate thickness Tmax at a vertically upper position above the Y-axis-direction origin position o spaced away from the projector 21). And when projection is conducted with the spread angle B1 onto a plate thickness t=0, a projection position YA on the placement table 7 (9) spaced away from the projector 21 is reduced by the reduction ratio R and adjusted to the reference position O. And when the plate thickness of the work W of the maximum measurement Ymax is set to t=0, a projection spread angle at an end edge of the work W becomes B2.

Here, when the plate thickness of the work W changes, a Y-axis-direction shift area (correction area) Yo is expressed as Yo=(Tmax−t)×tan B1. A measurement Yf shown in FIG. 3 is expressed as Yf=t×tan B1. Further, for the plate thickness Tmax, there is a protrusion of a measurement Yr on the opposite side of the origin position O. The protrusion quantity Yr in this case is expressed as Yr=Tmax×tan B2.

Here, as mentioned above, the aspect ratio of the projector 21 is 16:10 and the material ratio of the work W is 2:1. Namely, a processing range ratio of the work W is 2:1. Accordingly, it is impossible to adjust the processing range of the work as it is to the aspect ratio of the projector 21. To cope with this, an X-axis-direction part (corresponding to 16), i.e., a horizontal direction of the aspect ratio 16:10 is assigned (allocated) to a longer direction of 2 of the material ratio 2:1 of the work W.

Namely, along side of the work W is assigned to a horizontal direction of the aspect ratio of the projector 21. Accordingly, a short side of the work W is assigned to a vertical direction of the aspect ratio. In this case, 1 of the material ratio 2:1 is assigned to 10 of the aspect ratio 16:10. Here, the ratio is adjusted by (10−2=8) to 16:8 (2:1). Here, the part 2 of (8=10−2) is a part not displayed (blank) in the projection area of the projector 21.

As mentioned before, the projector 21 is beforehand positioned and set in a state that the X-axis-direction center position of the work W at the standby position 5 agrees with the center position 21C of the projector 21. And the projector 21 is positionally adjusted to the height measurement d from the top face of the shuttle table 7 (9) at the standby position 5 and the zoom ratio R is obtained according to R=Xmax'/{Xmax'+(Tmax−t)×tan A}.

Information concerning cut pieces to be projected onto the top face of the work W or onto a position adjacent to the work W is supplied from, for example, a personal computer to the projector. Here, the information concerning cut pieces is, for example, coordinate position data relative to an origin position of the work W (layout position data on the work W) of the cut pieces (products) processed from the work W, shape data of the respective cut pieces, and the like.

Figure 4:
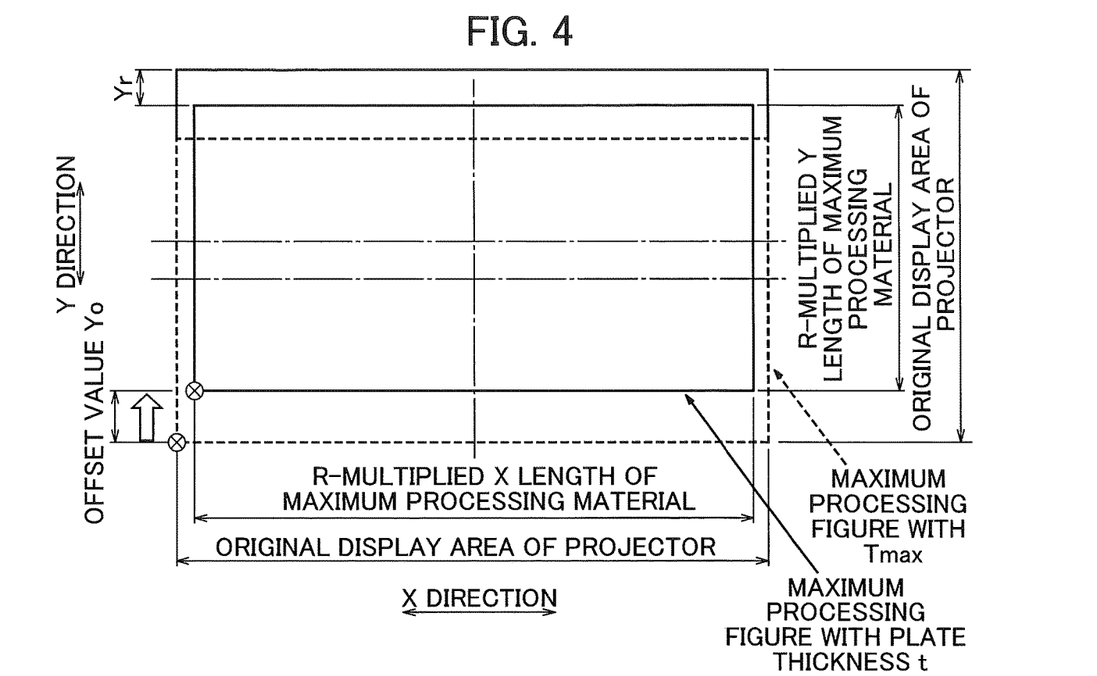
FIG. 4 is an explanatory view showing a work area and a projector displaying area.
Figure 5:
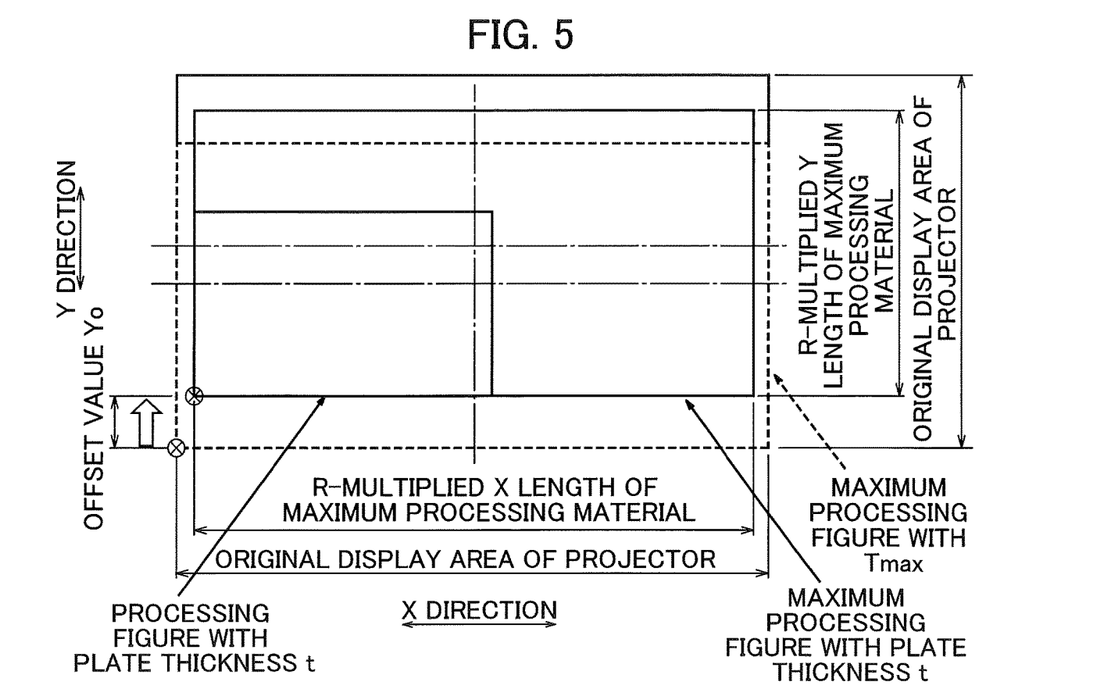
FIG. 5 is an explanatory view showing a work area and the projector displaying area.

FIGS. 4 and 5 show images prepared according to results of the above-mentioned calculations.

FIG. 4 shows a configuration of a relative relationship between a material and a projector position that is adjusted to be able to conduct projection over a maximum processing range in the X-axis direction with a processing maximum range and maximum stack height.

In FIG. 4, the reduction ratio is 1 and the reduction ratio of a formed image is determined according to a stack height.

Here, a projection image is beforehand reduced because a projected image enlarges as a material becomes distal (a stack height becomes lower).

In this example, a projection point of the projector and the center of a maximum processing material are arranged to agree with each other, and therefore, a place on the X-axis is determined with that reduction ratio.

On the other hand, with respect to the Y-axis direction, a reduction is made with a reduction ratio determined according to a stack height.

Further, a Y position is spaced away from the reference position by Yo depending on the stack height (refer to FIG. 3).

FIG. 5 is a view showing an image of a small material together with an estimated image of the reference maximum processing work.

Here, a display position is corrected by Yo that is a shift from a material-positioned reference point and varies depending on a stack height (plate thickness in the case of one piece).

As mentioned before, the information projecting apparatus is provided with the projector 21 and the placement tables (shuttle tables 7 and 9) in order to project information concerning cut pieces (products) onto top faces of the cut pieces that are placed on the shuttle table 7 and 9, i.e., the placement table positioned at the predetermined position (standby area 5) or onto a position adjacent to the cut pieces. Here, the predetermined position is a position where the cut pieces on the placement table are sorted and carried to the next process.

The placement table is positioned at the predetermined position in a state that a plurality of cut pieces are placed on the top face thereof. In this case, the cut pieces are placed on the placement table as in a state that they are cut by, for example, the laser processing apparatus. Alternatively, as a state before sorting for the next process, the cut pieces may beforehand be selected according to their sizes, shapes, and the like and may beforehand regularly be stacked and arranged at predetermined positions on the placement table. In this case, top face heights of the stacked cut pieces are always kept substantially at a fixed level. Accordingly, even if the information concerning the cut pieces is projected on the top faces of the respective cut pieces on the placement table, the cut pieces are not shaded.

Figure 6:
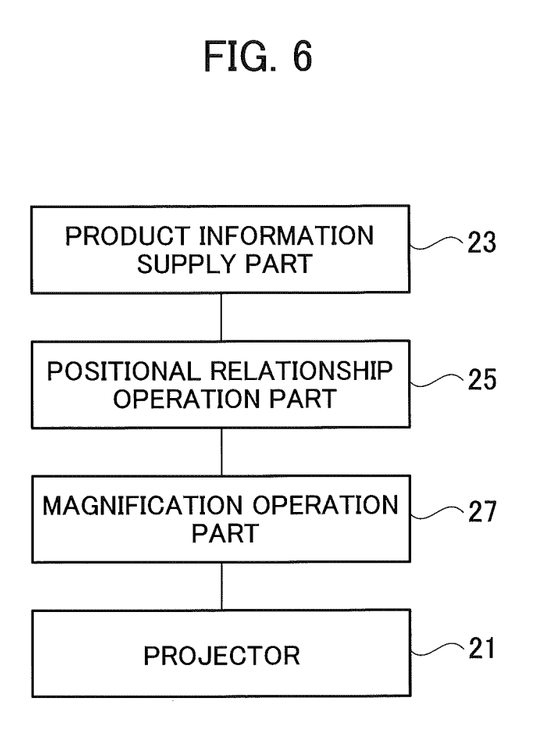
FIG. 6 is a block diagram showing functions connected to the projector.

As mentioned before, the projector 21 projects information concerning cut pieces onto the top face of a work W (cut pieces) on the shuttle table 7 (9) moved from the laser processing position 3 to the standby position 5 and positioned thereat or onto a position adjacent to the cut pieces so that the cut pieces are sorted and carried. The projector 21 is connected to, as shown in FIG. 6, a product information supply part 23 to supply product information to the projector 21. The product information supply part 23 is, for example, a personal computer that stores product information, an automatic programming device that supplies nesting data such as the arranged positions, shapes, measurements, and plate thicknesses of cut pieces arranged on a work W, or an NC device of the laser processing apparatus 1. The product information supply part 23 includes a projector setting information supply part such as a personal computer to supply data for the setting height d and data for the spread angles 2A, B1, and B2 of the projector 21. The product information supply part 23 may employ, when cut pieces are stacked on the placement table, a configuration to manually input the plate thicknesses, arranged positions, shapes, and measurement data of the respective cut pieces.

And the projector 21 is connected to a positional relationship operation part 25 to operate the positional relationship d between a cut piece and the projector 21 according to plate thickness information t of a work W on the placement table (shuttle table 7 and 9) positioned at the predetermined position (standby position 5). In this case, as mentioned before, the height position d is adjusted and set so that an X-axis-direction projection range with t=0 is expressed as {Xmax'+Tmax×tan A}×2. Namely, the height position d is operated by d={Xmax'+Tmax×tan A}. Here, Tmax is a stack height measurement when a plurality of cut pieces are stacked.

And the projector 21 is connected to a magnification operation part 27 to operate a zoom ratio of the projector 21 according to the height position data d operated by the positional relationship operation part 25. This magnification operation unit 27 operates the zoom ratio R according to the expression of R=Xmax'/(Xmax'+Xr)=Xmax'/{Xmax'+(Tmax−t)×tan A}. According to the operated zoom ratio R, the magnification of the projector 21 is changed to project information concerning a cut piece onto the cut piece or onto a position adjacent to the cut piece.

Accordingly, a worker sees information concerning cut pieces projected onto the cut pieces of a work W on the shuttle table 7 (9) at the standby position 5 and sorts the cut pieces for the next process. As a result, the cut piece sorting work by the worker can easily be achieved.

By the way, when the projector 21 displays and specifies a cut piece to be carried from among cut pieces on the shuttle table 7 (9), it is possible to project a different color onto the cut piece to be carried instead of the configuration of projecting information concerning the cut piece onto the top face of the cut piece or onto an adjacent position. It is also possible to conduct blinking projection onto the cut piece to be carried. Further, it is possible to display and specify the cut piece to be carried by projecting (emitting) a light spot onto the top face of the cut piece to be carried.

The configuration to display and specify a cut piece that is on the shuttle table 7 (9) and is to be carried is also realizable by properly combining a plurality of the above-mentioned displaying and specifying techniques.

As is understood from the above-mentioned explanation, after properly arranging the projector 21 with respect to the standby position 5, the top face of the shuttle table 7 (9) serving as a placement table at the standby position 5 is used as a reference and the zoom ratio R is operated according to a plate thickness (work stacking height) on the shuttle table 7 (9). According to the operated magnification (zoom ratio) and a Y-direction image shift conforming to the magnification, information concerning the cut piece is projected onto the top face of the cut piece or onto a position adjacent to the cut piece.

Accordingly, even if the top face position of the work W on the shuttle table 7 (9) varies depending on the plate thickness of the work W, the number of stacks, or the like, information concerning a cut piece of the work W on the shuttle table 7 (9) can correctly be projected for the cut piece.

The present invention is not limited to the above-mentioned embodiments, and by achieving proper modifications, the present invention can be embodied in other forms. Namely, the present invention is also applicable to a case that beforehand places a plural kinds of processed items at the same height on a pallet, i.e., a placement table, sorts the processed items on the pallet for, for example, delivery time, and carries them out.

INDUSTRIAL APPLICABILITY

According to the present invention, a positional relationship between a projector and a top face of a work on a placement table such as a pallet is found according to plate thickness information of the work, and with a zoom ratio based on the found positional relationship, information concerning a cut piece is projected onto a top face of the cut piece or onto a position adjacent to the cut piece. Accordingly, it is possible to always maintain the projector at a fixed position and correctly project the information with respect to the cut piece.

The invention claimed is:

1. An information projecting method of projecting information concerning a cut piece, which is cut and separated from a workpiece in the form of a plate and is on a placement table, onto the cut piece or onto a position adjacent to the cut piece from a projector, comprising:
   assigning a long side of the workpiece to an X-axis direction being a horizontal direction of an aspect ratio of the projector for adjusting the aspect ratio, the aspect ratio being a vertical to horizontal ratio of the projector;
   assigning a short side of the workpiece to a Y-axis direction being a vertical direction of the aspect ratio;
   finding a positional relationship between a top face of the workpiece and the projector according to plate thickness information and/or stacked number information of the workpiece on the placement table when the placement table is positioned at a predetermined position with respect to the projector; and
   projecting the information concerning the cut piece onto the cut piece or onto a position adjacent to the cut piece with a zoom ratio based on the found positional relationship.

2. The information projecting method as claimed in claim 1, wherein projection of light is conducted with a different color than the projected information onto a cut piece to be carried, blinking projection of light is conducted onto the cut piece to be carried, or a light spot is projected onto a top face of cut pieces to be carried, thereby displaying and specifying the cut piece or cut pieces to be carried.

3. The information projecting method as claimed in claim 1, wherein when B1 is set as a Y-axis spread angle of the projector at the time of conducting projection onto an upper end edge of a processing object workpiece having a maximum plate thickness at a Y-axis-direction origin position distal from the projector, the method adjusts a projection position of the information previously projected on the placement table with the spread angle B1 onto a plate thickness of zero distal from the projector, to a reference position of the processing object workpiece.

4. The information projecting method as claimed in claim 3, wherein projection of light is conducted with a different color than the projected information onto a cut piece to be carried, blinking projection of light is conducted onto the cut piece to be carried, or a light spot is projected onto a top face of the cut pieces to be carried, thereby displaying and specifying the cut piece or cut pieces to be carried.

5. A laser processing method comprising reciprocating a shuttle table between a laser processing position and a standby position and further comprising the information projecting method as claimed in claim 4 at a Y-axis-direction side position at the standby position.

6. An information projecting apparatus for projecting information concerning a cut piece, which is cut and separated from a in the form of a plate, onto the cut piece or onto a position adjacent to the cut piece comprising:
   a placement table on which the cut piece is placed by keeping a top face height position substantially constant;
   a projector that projects the information concerning the cut piece onto a top face of the cut piece on the placement table, or onto a position adjacent to the cut piece;
   a positional relationship operation part that adjusts a positional relationship between the top face of the cut piece and the projector according to plate thickness information of the cut piece on the placement table and/or stacked number information; and
   a magnification operation part that adjusts a zoom ratio of the projector according to an operation result of the positional relationship operation part,
   wherein the information concerning the cut piece is projected onto the cut piece or onto a position adjacent to the cut piece with the adjusted zoom ratio.

7. A laser processing apparatus having a shuttle table reciprocable between a laser processing position and a standby position comprising the information projecting apparatus as claimed in claim 6 at a Y-axis-direction side position at the standby position.

8. The information projecting apparatus as claimed in claim 6, wherein the positional relationship operation part is configured to adjust the positional relationship also according to a coordinate position of the projector arranged at a predetermined Y-axis-direction position and a plate thickness of the cut piece, a plate thickness of the workpiece, or a number of stacked cut pieces on the placement table.

9. A laser processing apparatus having a shuttle table reciprocable between a laser processing position and a standby position comprising the information projecting apparatus as claimed in claim 8 at a Y-axis-direction side position at the standby position.

* * * * *

UNITED STATES PATENT AND TRADEMARK OFFICE
CERTIFICATE OF CORRECTION

| | |
|---|---|
| PATENT NO. | : 10,974,347 B2 |
| APPLICATION NO. | : 16/635785 |
| DATED | : April 13, 2021 |
| INVENTOR(S) | : Saeki et al. |

Page 1 of 1

It is certified that error appears in the above-identified patent and that said Letters Patent is hereby corrected as shown below:

In the Claims

Column 10, Line 27, in Claim 6, Line 3, please insert --workpiece-- after "from a".

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*